(12) United States Patent
Dolan

(10) Patent No.: US 6,745,879 B1
(45) Date of Patent: Jun. 8, 2004

(54) HYDROMECHANICAL COUPLING WITH CLUTCH ASSEMBLY AND MAGNETORHEOLOGICAL CLUTCH ACTUATOR

(75) Inventor: James P. Dolan, Manlius, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/357,018

(22) Filed: Feb. 3, 2003

(51) Int. Cl.[7] .................... F16D 27/112; F16H 37/06
(52) U.S. Cl. .................. 192/35; 192/85 AA; 180/247
(58) Field of Search .................. 192/35, 21.5, 85 AA; 192/57; 180/247, 242; 137/807; 74/665 GE (56) References Cited

U.S. PATENT DOCUMENTS

| | | | |
|---|---|---|---|
| 3,448,751 A | * | 6/1969 | Rosaen ................. 137/807 |
| 4,444,298 A | | 4/1984 | Stangroom |
| 4,895,236 A | | 1/1990 | Sakakibara et al. |
| 4,896,754 A | | 1/1990 | Carlson et al. |
| 5,007,513 A | | 4/1991 | Carlson |
| 5,147,252 A | | 9/1992 | Mace et al. |
| 5,322,484 A | | 6/1994 | Reuter |
| 5,323,871 A | | 6/1994 | Wilson et al. |
| 5,358,084 A | | 10/1994 | Schramm |
| 5,407,024 A | | 4/1995 | Watson et al. |
| 5,423,235 A | | 6/1995 | Botterill et al. |
| 5,730,531 A | | 3/1998 | Pinkos et al. |
| 5,779,013 A | | 7/1998 | Bansbach |
| 5,845,753 A | * | 12/1998 | Bansbach ............ 192/21.5 |
| 5,915,513 A | | 6/1999 | Isley, Jr. et al. |
| 6,183,386 B1 | | 2/2001 | Duggan |
| 6,269,925 B1 | * | 8/2001 | Brunken ............... 192/21.5 |
| 6,318,531 B1 | | 11/2001 | Usoro et al. |
| 6,334,832 B1 | | 1/2002 | Heravi et al. |
| 6,371,267 B1 | * | 4/2002 | Kao et al. ............. 192/21.5 |
| 6,412,618 B1 | | 7/2002 | Stretch et al. |
| 6,428,441 B1 | * | 8/2002 | Hunt ..................... 475/231 |
| 6,454,674 B1 | * | 9/2002 | Krzesicki et al. ........ 475/85 |
| 6,527,661 B2 | * | 3/2003 | Leeper ................... 475/150 |

FOREIGN PATENT DOCUMENTS

| | | |
|---|---|---|
| JP | 60-1432 | 7/1985 |
| RU | 0684211 | 9/1979 |
| RU | 1434-177 A | 10/1986 |

* cited by examiner

Primary Examiner—Saul Rodriguez
(74) Attorney, Agent, or Firm—Harness, Dickey & Pierce P.L.C.

(57) ABSTRACT

A transfer mechanism is provided for controlling a magnitude of clutch engagement force exerted on a multi-plate clutch assembly operably disposed between input and output members. The transfer clutch includes an actuator fixed for rotation with the input member, a piston slidably disposed within a piston chamber of the actuator and selectively engaging the multi-plate clutch assembly, a pump in fluid communication with the piston chamber, and operably engaged with the input member and the output member. A rotational speed differential between the input member and the output member induces pumping action for pumping a magnetorheological fluid through the piston chamber. An electromagnetic coil is operably disposed between the piston chamber and the pump. The electromagnetic coil is selectively energized for manipulating a viscosity of the magnetorheological fluid to induce a back pressure within the piston chamber, thereby inducing axial movement of the piston for engaging the clutch pack.

15 Claims, 6 Drawing Sheets

HYDROMECHANICAL COUPLING WITH CLUTCH ASSEMBLY AND MAGNETORHEOLOGICAL CLUTCH ACTUATOR

FIELD OF THE INVENTION

The present invention relates generally to power transfer systems for controlling the distribution of drive torque between the front and rear drivelines of a four-wheel drive vehicle. More particularly, the present invention is directed to a power transmission device adapted for use in motor vehicle driveline applications having a magnetorheological clutch actuator that is operable for controlling actuation of a multi-plate clutch assembly.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. In contrast, drive torque is only delivered to the primary driveline when the lock-up clutch is released for establishing a two-wheel drive mode.

A modern trend in four-wheel drive motor vehicles is to equip the power transmission device with an adaptive transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator can be a power-operated device that is actuated in response to the magnitude of an electric control signal sent from an electronic controller unit (ECU). Variable control of the control signal is typically based on changes in current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

Currently, a large number of on-demand transfer cases are equipped with an electrically-controlled clutch actuator that can regulate the amount of drive torque transferred to the secondary output shaft as a function of the value of the electrical control signal applied thereto. In some applications, the transfer clutch employs an electromagnetic clutch as the power-operated clutch actuator. For example, U.S. Pat. No. 5,407,024 discloses an electromagnet that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, a need exists to advance the technology and address recognized system limitations. For example, the size, weight and electrical power requirements of the electromagnetic coil or the electric motors needed to provide the described clutch engagement loads may make such system cost prohibitive in some four-wheel drive vehicle applications. In an effort to address these concerns, new technologies are being considered for use in power-operated clutch actuator applications such as, for example, magnetorheological clutch actuators. Examples of such an arrangement are described in U.S. Pat. Nos. 5,915,513 and 6,412,618 wherein a magnetorheological actuator controls operation of a ball-ramp unit to engage the clutch pack. While such an arrangement may appear to advance the art, its complexity clearly illustrates the need to continue development of even further defined advancement.

SUMMARY OF THE INVENTION

Thus, its is an object of the present invention to provide a power transmission device for use in a motor vehicle having a torque transfer mechanism equipped with a magnetorheological clutch actuator that is operable for controlling engagement of a friction clutch.

As a related object, the torque transfer mechanism of the present invention is well-suited for use in motor vehicle driveline applications to control the transfer of drive torque between a first rotary member and a second rotary member.

It is a further object of the present invention to provide a magnetorheological clutch actuator having a piston disposed in a piston chamber for engaging a multi-plate clutch assembly, a pump for supplying magnetorheological fluid to the piston chamber, and an electromagnetically-controlled flow control system for use in a torque transfer mechanism.

According to a preferred embodiment, the torque transfer mechanism includes a housing fixed for rotation with the input member and which has a piston chamber formed therein, a piston slidably disposed within the piston chamber and selectively engageable with a clutch pack of the multi-plate clutch assembly, and a pump in fluid communication with the piston chamber and which is operably disposed between the input member and the output member. The occurrence of a rotational speed differential between the input member and the output member causes the pump to generate a pumping action for pumping a magnetorheological fluid through a flow circuit between the pump and the piston chamber. An electromagnet can be selectively energized for varying the viscosity of the magnetorheological fluid flowing in the flow circuit downstream of the piston chamber to induce a back pressure within the piston chamber, thereby inducing axial movement of the piston for engaging the clutch pack.

In operation, activation of the electromagnet creates a magnetic field which passes through the magnetorheological fluid within a flow passage in the flow circuit for changing its viscosity and restricting flow through the flow passage. The restricted flow induces the back pressure within the piston chamber, thereby inducing axial movement of the piston. The piston pushes against a pressure plate to exert a clutch engagement force on the clutch pack. Upon deactivation of the electromagnet, a return spring releases the clutch pack from engagement and acts to axially move the piston back to a neutral position.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in motor vehicle drivelines as, for example, an on-demand clutch in a transfer case or in-line torque coupling, a biasing clutch associated with a differential assembly in a transfer case or a drive axle assembly, or as a shift clutch in power transmission assemblies. Thus, while the present invention is hereinafter described in association with specific structural embodiments for use in various driveline applications, it will be understood that the arrangements shown and described are merely intended to illustrate exemplary embodiments of the present invention.

Figure 1:
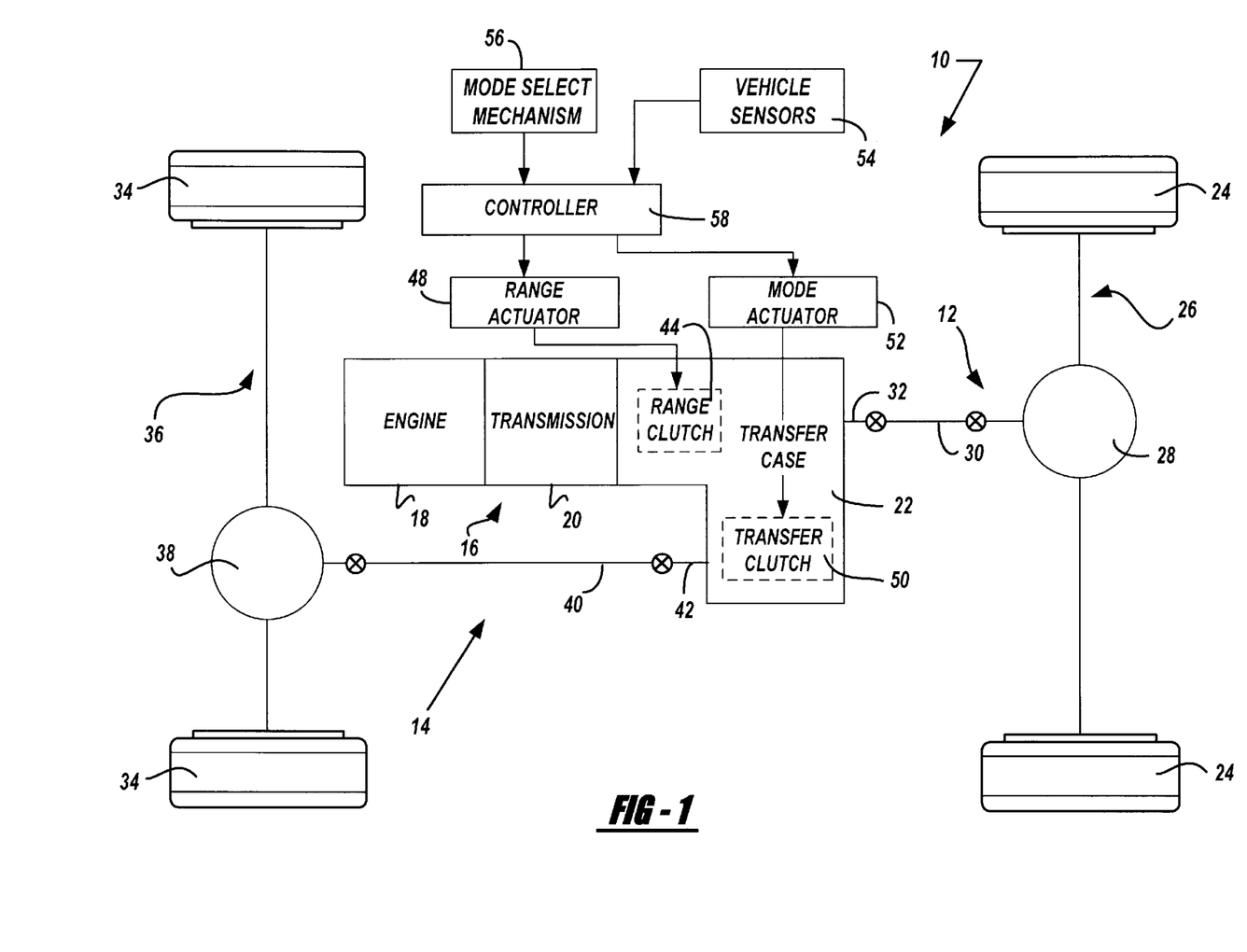
FIG. 1 illustrates the drivetrain of a four-wheel drive vehicle equipped with a power transmission device incorporating the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an electronically-controlled power transfer system for permittinrg a vehicle operator to possibly select between a two-wheel high-range drive mode, a part-time four-wheel high-range drive mode, an on-demand four-wheel high-range drive mode, a neutral non-driven mode, and a part-time four-wheel low-range drive mode. In this regard, transfer case 22 is equipped with a range clutch 44 that is operable for establishing the high-range and low-range drive connections between an input shaft 46 and rear output shaft 32, and a power-operated range actuator 48 operable to actuate range clutch 44. Transfer case 22 also includes a transfer clutch 50 that is operable for transferring drive torque from rear output shaft 32 to front output shaft 42 for establishing the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of range actuator 48 and mode actuator 52 in response to input signals from vehicle sensors 54 and mode selector 56.

Figure 2:
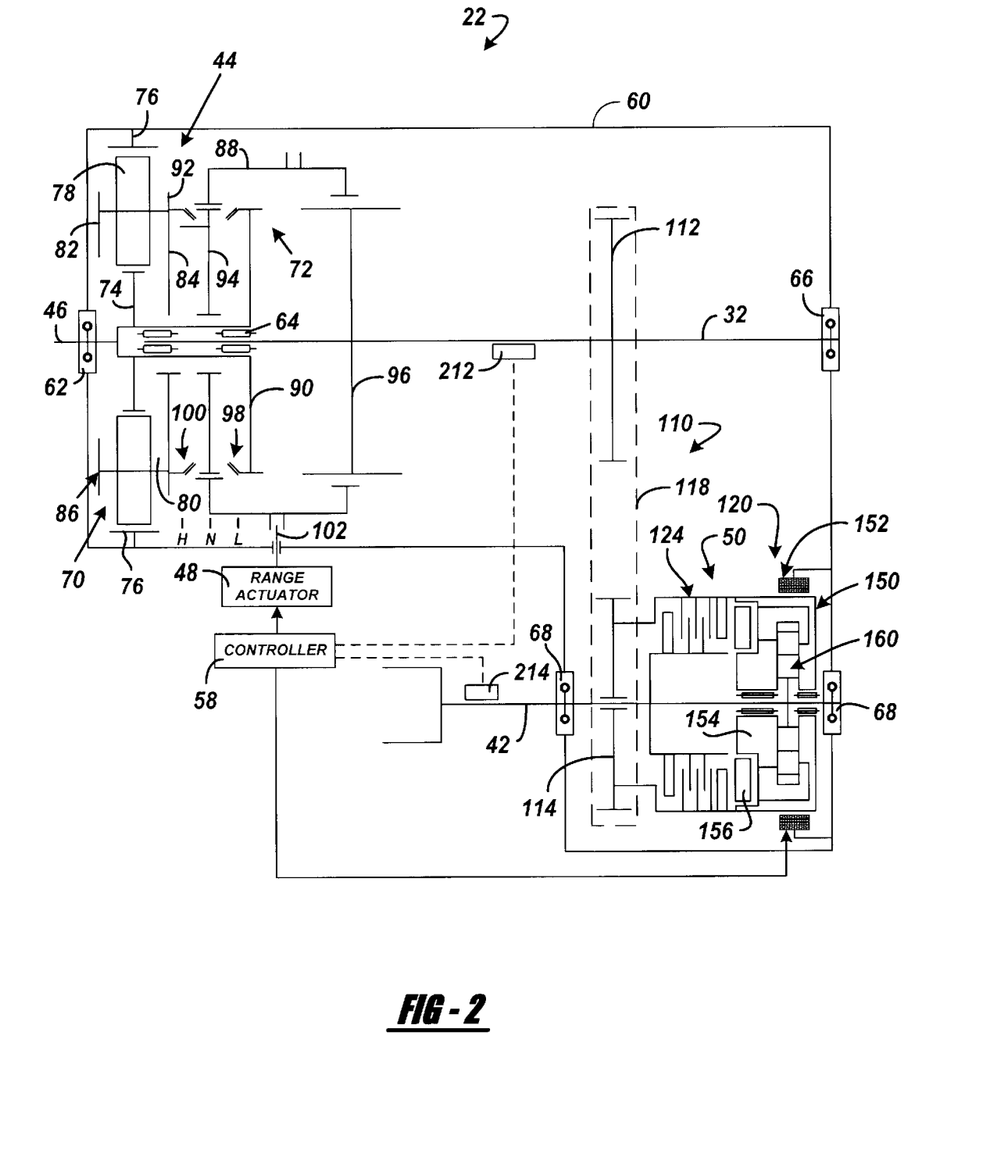
FIG. 2 is a schematic illustration of a four-wheel drive transfer case equipped a torque transfer mechanism having a magnetorheological clutch actuator and a multi-plate clutch assembly.

Transfer case 22 is shown schematically in FIG. 2 to include a housing 60 from which input shaft 46 is rotatably supported by bearing assembly 62. Input shaft 46 is adapted for connection to the output shaft of transmission 20. Rear output shaft 32 is also shown rotatably supported between input shaft 46 and housing 60 via bearing assemblies 64 and 66 while front output shaft 42 is rotatably supported between transfer clutch 50 and housing 60 by a pair of laterally-spaced bearing assemblies 68. Range clutch 44 is shown to include a planetary gearset 70 and a synchronized range shift mechanism 72.

Planetary gearset 70 includes a sun gear 74 fixed for rotation with input shaft 46, a ring gear 76 fixed to housing 60, and a set of planet gears 78 rotatably supported on pinion shafts 80 extending between front and rear carrier rings 82 and 84, respectively, that are interconnected to define a carrier 86. Planetary gearset 70 functions as a two-speed reduction unit which, in conjunction with a sliding range sleeve 88 of synchronized range shift mechanism 72, is operable to establish either of a first or second drive connection between input shaft 46 and rear output shaft 32. To establish the first drive connection, input shaft 46 is directly coupled to rear output shaft 32 for defining a high-range drive mode in which rear output shaft 32 is driven at a first (i.e., direct) speed ratio relative to input shaft 46. Likewise, the second drive connection is established by coupling carrier 86 to rear output shaft 32 for defining a low-range drive mode in which rear output shaft 32 is driven at a second (i.e., reduced) speed ratio relative to input shaft 46. A neutral non-driven mode is established when rear output shaft 32 is disconnected from both input shaft 46 and carrier 86.

Synchronized range shift mechanism 72 includes a first clutch plate 90 fixed for rotation with input shaft 46, a second clutch plate 92 fixed for rotation with rear carrier ring 84, a clutch hub 94 rotatably supported on input shaft 46 between clutch plates 90 and 92, and a drive plate 96 fixed for rotation with rear output shaft 32. Range sleeve 88 has a first set of internal spline teeth that are shown meshed with external spline teeth on clutch hub 94, and a second set of internal spline teeth that are shown meshed with external spline teeth on drive plate 96. As will be detailed, range sleeve 88 is axially moveable between three distinct positions to establish the high-range, low-range and neutral modes. Range shift mechanism 72 also includes a first synchronizer assembly 98 located between hub 94 and first clutch plate 90 and a second synchronizer assembly 100 is disposed between hub 94 and second clutch plate 92. Synchronizers 98 and 102 work in conjunction with range sleeve 88 to permit on-the-move range shifts.

With range sleeve 88 located in its neutral position, as denoted by position line "N", its first set of spline teeth are disengaged from the external clutch teeth on first clutch plate 90 and from the external clutch teeth on second clutch plate 92. First synchronizer assembly 98 is operable for causing speed synchronization between input shaft 46 and rear output shaft 32 in response to sliding movement of range sleeve 88 from its N position toward a high-range position, denoted by position line "H". Upon completion of speed synchronization, the first set of spline teeth on range sleeve 88 move into meshed engagement with the external clutch teeth on first clutch plate 90 while its second set of spline teeth are maintained in engagement with the spline teeth on drive plate 96. Thus, movement of range sleeve 88 to its H position acts to couple rear output shaft 32 for common rotation with input shaft 46 and establishes the high-range drive connection therebetween. Similarly, second synchronizer assembly 100 is operable for causing speed synchronization between carrier 86 and rear output shaft 32 in response to sliding movement of range sleeve 88 from its N position to a low-range position, as denoted by position line "L". Upon completion of speed synchronization, the first set of spline teeth on range sleeve 88 move into meshed engagement with the external clutch teeth on second clutch plate 92 while the second set of spline teeth on range sleeve 88 are maintained in engagement with the external spline teeth on drive plate 96. Thus with range sleeve 88 located in its L position, rear output shaft 32 is coupled for rotation with carrier 86 and establishes the low-range drive connection between input shaft 46 and rear output shaft 32.

To provide means for moving range sleeve 88 between its three distinct range position, range shift mechanism 72 further includes a range fork 102 coupled to range sleeve 88 and which is mounted on a shift rail (not shown) for axial movement thereon. Range actuator 48 is operable to move range fork 102 on the shift rail for causing corresponding axial movement of range sleeve 88 between its three range positions. Range actuator 48 is preferably an electric motor arranged to move range sleeve 88 to a specific range position in response to a control signal from controller 58 that is based on the mode signal delivered to controller 58 from mode select mechanism 56.

It will be appreciated that the synchronized range shift mechanism permits "on-the-move" range shifts without the need to stop the vehicle which is considered to be a desirable feature. However, other synchronized and non-synchronized versions of range clutch 44 can be used in substitution for the particular arrangement shown. Also, it is contemplated that range clutch 44 can be removed entirely from transfer case 22 such that input shaft 46 would directly drive rear output shaft 32 to define a one-speed version of the on-demand transfer case embodying the present invention.

Figure 3:
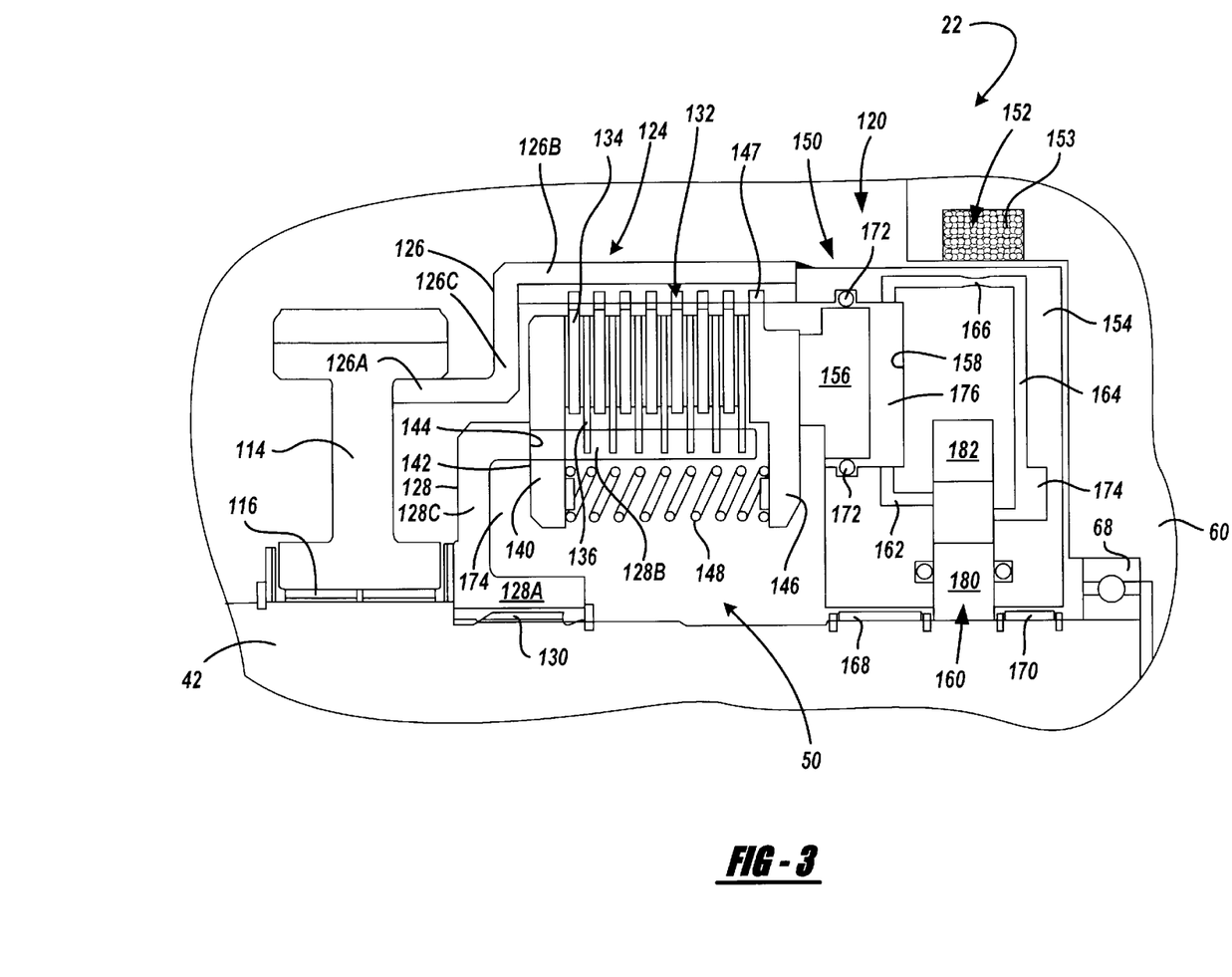
FIG. 3 is a partial sectional view of the torque transfer mechanism arranged for selectively transferring drive torque from the primary output shaft to the secondary input shaft.

Referring now primarily to FIGS. 2 and 3, transfer clutch 50 is shown arranged in association with front output shaft 42 in such a way that it functions to deliver drive torque from a transfer assembly 110 driven by rear output shaft 32 to front output shaft 42 for establishing the four-wheel drive modes. Transfer assembly 110 includes a first sprocket 112 fixed for rotation with rear output shaft 32, a second sprocket 114 rotatably supported by bearings 116 on front output shaft 42, and a power chain 118 encircling sprockets. 112 and 114. As will be detailed, transfer clutch 50 is a multi-plate clutch assembly 124 and mode actuator 52 is a magnetorheological clutch actuator 120 which together define a torque transfer mechanism.

Multi-plate clutch assembly 124 is shown to include an annular drum 126 fixed for rotation with second sprocket 114, a hub 128 fixed via a splined connection 130 for rotation with front output shaft 42, and a multi-plate clutch pack 132 operably disposed between drum 126 and hub 128. In particular, drum 126 has a first smaller diameter cylindrical rim 126A that is welded to sprocket 114 and a second larger diameter cylindrical rim 126B that is interconnected to rim 126A by a radial plate segment 126C. Hub 128 is shown to include a first smaller diameter hub segment 128A and a second larger diameter hub segment 128B that are interconnected by a radial plate segment 128C. Clutch pack 132 includes a set of outer friction plates 134 splined to outer rim 126B of drum 126 and which are alternatively interleaved with a set of inner friction plates 136 splined to hub segment 128B of clutch hub 128. Clutch assembly 124 further includes a first pressure plate 138 having a plurality of circumferentially-spaced and radially-extending tangs 140 that are slid into longitudinally-extending slots formed in hub segment 128B prior to installation of clutch pack 132 such that a front face surface 142 of tangs 140 abut an end surface 144 of the slots so as to define a fully retracted position of first pressure plate 138 relative to clutch pack 132. Thus, first pressure plate 138 is coupled for rotation with clutch hub 128 and front output shaft 42. A second pressure plate 146 is splined to rim 126B of drum 128 for rotation therewith. As seen, a plurality of circumferentially spaced return spring 148 act between pressure plates 138 and 146.

With continued reference to FIGS. 2 and 3, magnetorheological clutch actuator 120 is generally shown to include a hydraulic operator 150 and a source of electromagnetic energy, such as an electromagnet 152. Hydraulic operator 150 includes a piston housing 154, a piston 156 slidably disposed in a chamber 158 formed in piston housing 154, and a positive displacement pump 160. A closed (i.e., recirculatory) flow circuit is provided between pump 160 and chamber 158. In particular, a supply passage 162 is provided to supply fluid from the outlet of pump 160 to chamber 158 and a return passage 164 is provided to supply fluid from chamber 158 to the inlet of pump 160. A flow restrictor 166 is provided in a portion of return passage 164 and is located in proximity to coil 153 of electromagnet 152.

Piston housing 154 is fixed for rotation with drum 126 and is rotatably supported from housing 60 and first output shaft 42 by bearing assemblies 168 and 170. Piston 156 is sealed relative to piston housing 154 within chamber 158 via suitable seal rings 172. An annular accumulator chamber 174 communicates with return passage 164 which, along with chamber 158, is filled with a magnetorheological (MR)

fluid 176, preferably of a high viscosity and of a type supplied by Lord Corporation, Erie, Pa.

Pump 160 is preferably a gerotor pump having a first pump element 180 fixed for rotation with front output shaft 42 and a second pump element 182 rotatable with piston housing 154. A pumping action is generated between the first and second pump elements in response to speed differentiation between front output shaft 42 and piston housing 154 which is driven by rear output shaft 32 via transfer assembly 110 and drum 125. MR fluid 176 is pumped from the discharge side of pump 160 into supply passage 162 and chamber 158 with a fluid pressure that is directly related to the magnitude of the rotational speed differential between first pump element 180 and second pump element 182. This pumping action also causes fluid to be drawn from chamber 158 into return passage 164 for delivery to the low pressure inlet side of pump 160.

In its most viscous state, MR fluid 176 is pumped through piston chamber 158 by pump 160 without affecting movement of piston 156 within chamber 158. However, application of a magnetic field due to energization of electromagnetic coil 153, causes MR fluid 176 to become more viscous in the area within and around restrictor 166. Flow restrictor 166 can be a valve installed in return line 164 or simply a reduced section of return line 164. In this manner, the flow rate of MR fluid 176 through flow restrictor 166 is reduced due to the increased viscosity, thereby inducing a back pressure within chamber 158. This back pressure causes axial movement of piston 156 within chamber 158 which, in turn, results in engagement of clutch pack 132.

The biasing force of return springs 148 acts to limit axial movement of piston 156, in opposition to the fluid pressure exerted on piston 156 within chamber 158. For example, in its least viscous form, MR fluid 176 has no effect and is simply circulated through chamber 158. In its most viscous form, especially in the area of restrictor 166, MR fluid 176 induces significant back pressure within chamber 158, thereby inducing axial movement of piston 156 to a position wherein clutch pack 132 is fully engaged. However, as clutch pack 132 engages and drive torque is transferred to front output shaft 42, the relative rotation between piston housing 154 and front output shaft 42 is reduced. Thus, the pumping action of pump 160 will decrease until there is no pumping action upon full engagement of clutch pack 132.

Variations in the viscosity of MR fluid 176 are achievable between the least viscous and most viscous form of MR fluid 176 and vary with the intensity of the magnetic field and, thus, with the magnitude of the electric control signal sent by controller 58 to electromagnetic coil 153. As such, the value of the clutch engagement force exerted by piston 156 and applied to clutch pack 132 can be adaptively varied as a function of the magnitude of the electric control signal sent to electromagnetic coil 153 between a no torque transfer condition (two-wheel drive mode with 100% of drive torque to rear output shaft 32) and a torque-split condition (part-time four-wheel drive mode with 50% of drive torque to front output shaft 42 and 50% to rear output shaft 32). Upon decease of the magnetic field, piston 156 is biased by springs 148 against second pressure plate 146, thereby relieving engagement of clutch pack 132 and moving piston 156 toward its released position.

In operation, when mode selector 56 indicates selection of the two-wheel high-range drive mode, range actuator 48 is signaled to move range sleeve 88 to its H position and transfer clutch 50 is maintained in a released condition with no electric signal sent to electromagnetic coil 153 of magnetorheological clutch actuator 120, whereby all drive torque is delivered to rear output shaft 32. If mode selector 56 thereafter indicates selection of a part-time four-wheel high-range mode, range sleeve 86 is maintained in its H position and a predetermined maximum electrical control signal is sent by controller 58 to electromagnetic coil 153 of magnetorheological actuator 120 which induces axial movement of piston 156 due to the resultant change in viscosity of MR fluid 176 within flow restrictor 166. Such axial movement of piston 156 to a fully engaged position causes a maximum clutch engagement force to be exerted on clutch pack 132 for effectively coupling hub 128 to drum 126. In response to such movement of second pressure plate 146, return springs 148 are compressed and acts to forcibly locate first pressure plate 138 in its fully retracted position where it acts as a reaction plate against which clutch pack 132 is compressed.

If a part-time four-wheel low-range drive mode is selected, the operation of multi-plate clutch assembly 124 and magnetorheological clutch actuator 120 are identical to that described above for the part-time high-range drive mode. However, in this mode, range actuator 48 is signaled to locate range sleeve 88 in its L position to establish the low-range drive connection between input shaft 46 and rear output shaft 32.

When the mode signal indicates selection of the on-demand four-wheel high-range drive mode, range actuator 48 moves or maintains range sleeve 88 in its H position and magnetorheological clutch actuator 120 is placed in a ready or "stand-by" condition. Specifically, the minimum amount of drive torque sent to front-output shaft 42 through transfer clutch 50 in the stand-by condition can be zero or a slight "pre-load" amount (i.e., in the range of 2–10%) as required for the certain vehicular applications. This minimum stand-by torque transfer is generated by controller 58 sending a control signal having a predetermined minimum value to electromagnetic to coil 153. Thereafter, controller 58 determines when and how much drive torque needs to be transferred to front output shaft 42 based on tractive conditions and/or vehicle operating characteristics detected by vehicle sensors 54. For example, FIG. 2 shows a first speed sensor 212 which sends a sensor signal to controller 58 indicative of the rotary speed of rear output shaft 32 while a second speed sensor 214 sends a sensor signal to controller 58 indicative of the rotary speed of front output shaft 42. Controller 58 is programmed to vary the value of the electric control signal sent to electromagnet coil 153 between the predetermined minimum value and the predetermined maximum value based upon defined relationships such as, for example, the speed difference (ΔRPM) between output shafts 32 and 42.

Providing an electric control signal to electromagnetic coil 153 having a value between the predefined minimum and maximum values generates a magnetic field having a corresponding intensity and which is directed through to MR fluid 176 for varying the fluid viscosity and the flow through flow restrictor 166. When drum 126 is rotating at a different speed than hub 128, back pressure within chamber 158 is induced, thereby inducing axial movement of piston 156 for applying a corresponding clutch engagement force on clutch pack 132. In this manner, clutch pack 132 is partially engaged and a limit (something less than the fully-engaged limit described above) is achieved.

While the torque transfer mechanism is shown arranged on front output shaft 42, it is evident that it could easily be installed on rear output shaft 32 for transferring drive torque to a transfer assembly arranged to drive front output shaft 42. Likewise, the present invention can be used as a torque transfer coupling in an all-wheel drive (AWD) vehicle to selectively and/or automatically transfer drive torque on-demand from the primary (i.e., front) driveline to the secondary (i.e., rear) driveline. Likewise, in full-time transfer cases equipped with an interaxle differential, transfer clutch 50 could be used to limit slip and bias torque across the differential.

Figure 4:
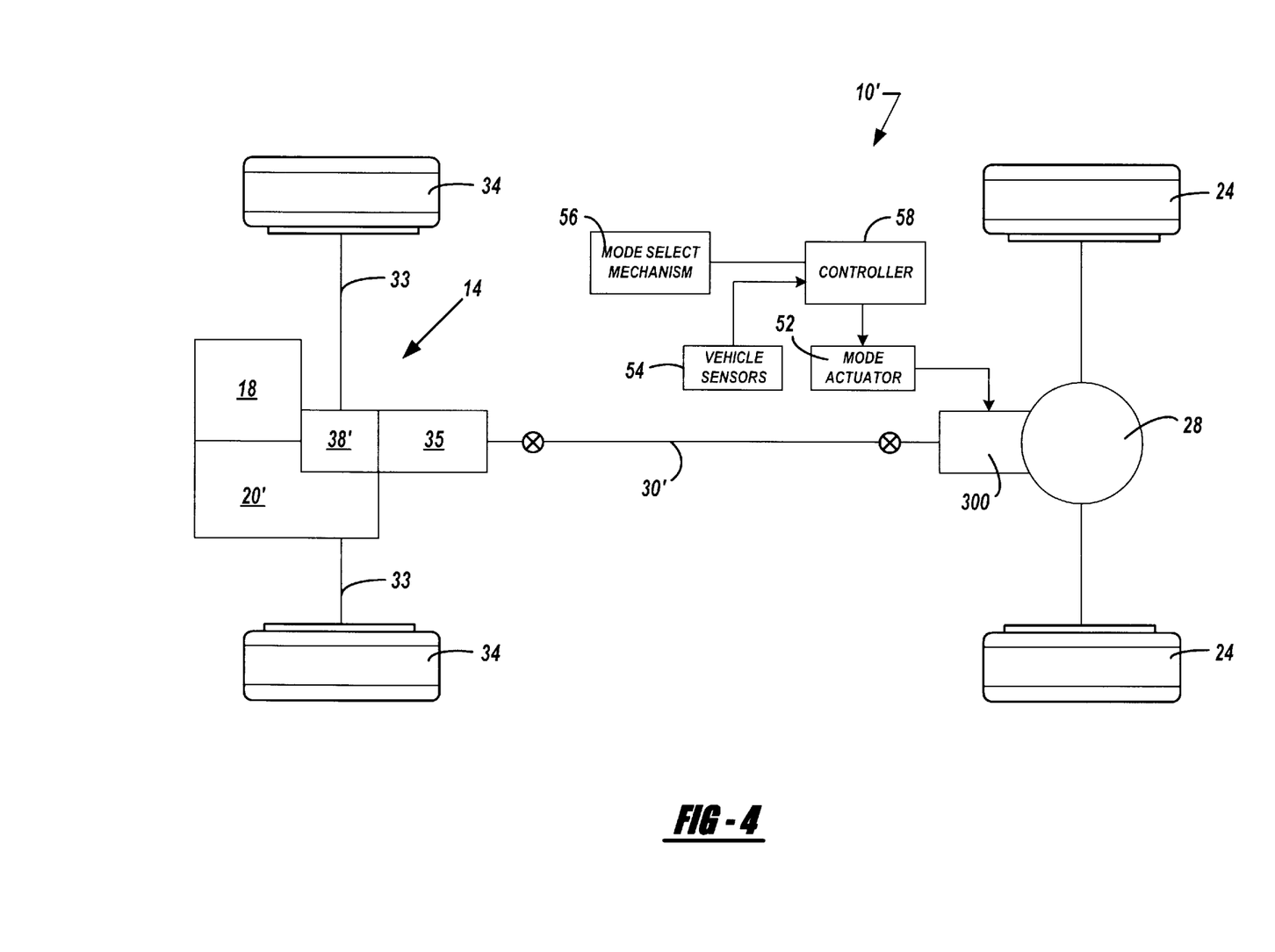
FIG. 4 is a schematic illustration of an alternative drivetrain for a four-wheel drive vehicle equipped with a power transmission device according to the present invention.

To illustrate an alternative power transmission device to which the present invention is applicable, FIG. 4 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer unit 35 is also driven by transmission 20' for delivering drive torque to the input member of a torque transfer coupling 300 via a drive shaft 30'. In particular, the input member of transfer coupling 300 is coupled to drive shaft 30' while its output member is coupled to a drive component of rear differential 28. Accordingly, when sensors indicate the occurrence of a front wheel slip condition, controller 58 adaptively controls actuation of torque coupling 300 such that drive torque is delivered "on-demand" to rear wheels 24. It is contemplated that torque transfer coupling 300 would include a multi-plate clutch assembly 124 and a magnetorheological clutch actuator 120 that are generally similar to the arrangement described previously. While shown in association with rear differential 28, it is contemplated that torque coupling 300 could also be operably located for transferring drive torque from transfer unit 35 to drive shaft 30'.

Figure 5:
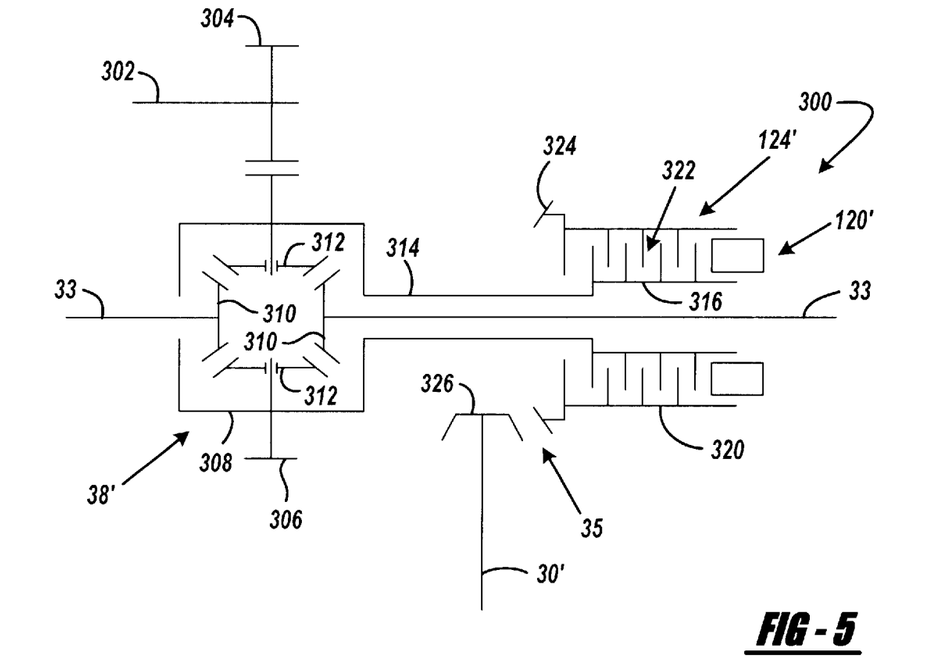
FIGS. 5 through 8 are schematic illustrations of alternative embodiments for power transmission devices according to the present invention.

Referring now to FIG. 5, torque coupling 300 is schematically illustrated in association with an on-demand four-wheel drive system that is based on a front-wheel drive vehicle similar to that shown in FIG. 4. In particular, an output shaft 302 of transaxle 20' is shown to drive an output gear 304 which, in turn, drives an input gear 306 fixed to a carrier 308 associated with front differential unit 38'. To provide drive torque to front wheels 34, front differential unit 38' includes a pair of side gears 310 that are connected to front wheels 34 via axleshafts 33. Differential unit 38' also includes pinions 312 that are rotatably supported on pinion shafts fixed to carrier 308 and which are meshed with side gears 310. A transfer shaft 314 is provided to transfer drive torque from carrier 308 to a clutch hub 316 associated with a multi-pate clutch assembly 124'. Clutch assembly 124' further includes a drum 320 and a clutch pack 322 having interleaved clutch plates operably connected between hub 316 and drum 320.

Transfer unit 35 is a right-angled drive mechanism including a ring gear 324 fixed for rotation with drum 320 of clutch assembly 124' which is meshed with a pinion gear 326 fixed for rotation with drive shaft 30'. As seen, a magnetorheological clutch actuator 120' is schematically illustrated for controlling actuation of clutch assembly 124'. According to the present invention, magnetorheological actuator 120' is similar to the magnetorheological clutch actuator previously described in that an electromagnetic coil is supplied with electric current for changing the viscosity of a magnetorheological fluid which, in turn, functions to control translational movement of a piston for engaging clutch pack 322.

In operation, drive torque is transferred from the primary (i.e., front) driveline to the secondary (i.e., rear) driveline through torque coupling 300 in accordance with the particular mode selected by the vehicle operator via mode selector 56. For example, if the on-demand 4WD mode is selected, controller 58 modulates actuation of magnetorheological clutch actuator 120' in response to the vehicle operating conditions detected by sensors 54 by varying the value of the electric control signal sent to the electromagnetic coil. In this manner, the level of clutch engagement and the amount of drive torque that is transferred through clutch pack 322 to the rear driveline through transfer unit 35 and drive shaft 30' is adaptively controlled. Selection of a locked or part-time 4WD mode results in full engagement of clutch assembly 124' for rigidly coupling the front driveline to the rear driveline. In some applications, the mode selector 56 may be eliminated such that only the on-demand 4WD mode is available so as to continuously provide adaptive traction control without input from the vehicle operator.

Figure 6:
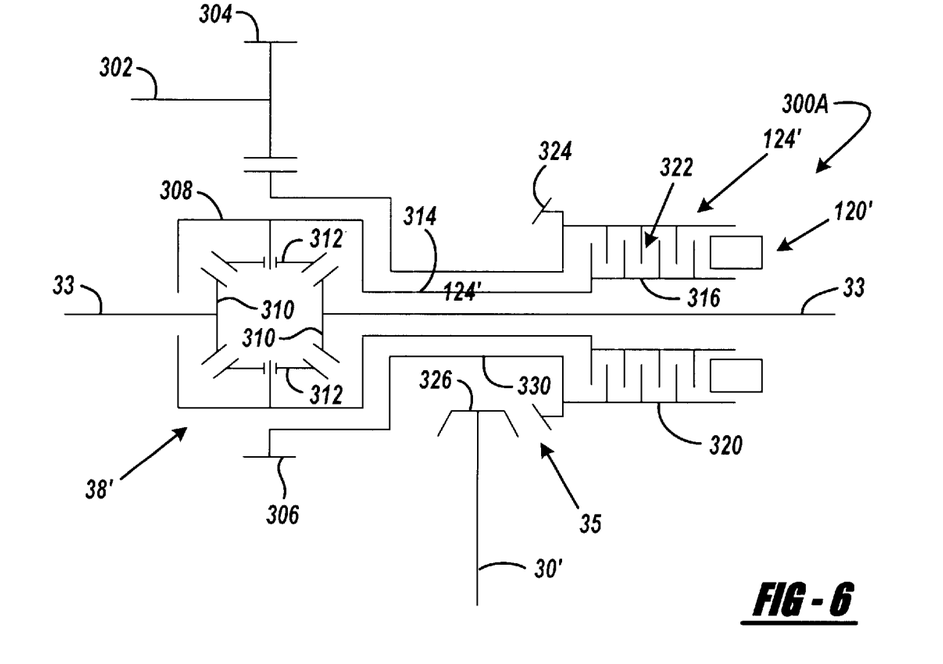

FIG. 6 illustrates a modified version of FIG. 5 wherein an on-demand four-wheel drive system is shown based on a rear-wheel drive motor vehicle that is arranged to normally deliver drive torque to rear wheels 24 while selectively transmitting drive torque to front wheels 34 through a torque coupling 300A. In this arrangement, drive torque is transmitted directly from transmission output shaft 302 to transfer unit 35 via a drive shaft 330 interconnecting input gear 306 to ring gear 324. To provide drive torque to front wheels 34, torque coupling 300A is shown operably disposed between drive shaft 330 and transfer shaft 314. In particular, clutch assembly 124' is arranged such that drum 320 is driven with ring gear 324 by drive shaft 330. As such, actuation of magnetorheological clutch actuator 120' functions to transfer torque from drum 320 through clutch pack 322 to hub 316 which, in turn, drives carrier 308 of front differential unit 38' via transfer shaft 314. Again, the vehicle could be equipped with mode selector 56 to permit selection by the vehicle operator of either the adaptively controlled on-demand 4WD mode or the locked part-time 4WD mode. In vehicles without mode selector 56, the on-demand 4WD mode is the only mode available and which provides continuous adaptive traction control with input from the vehicle operator.

Figure 7:
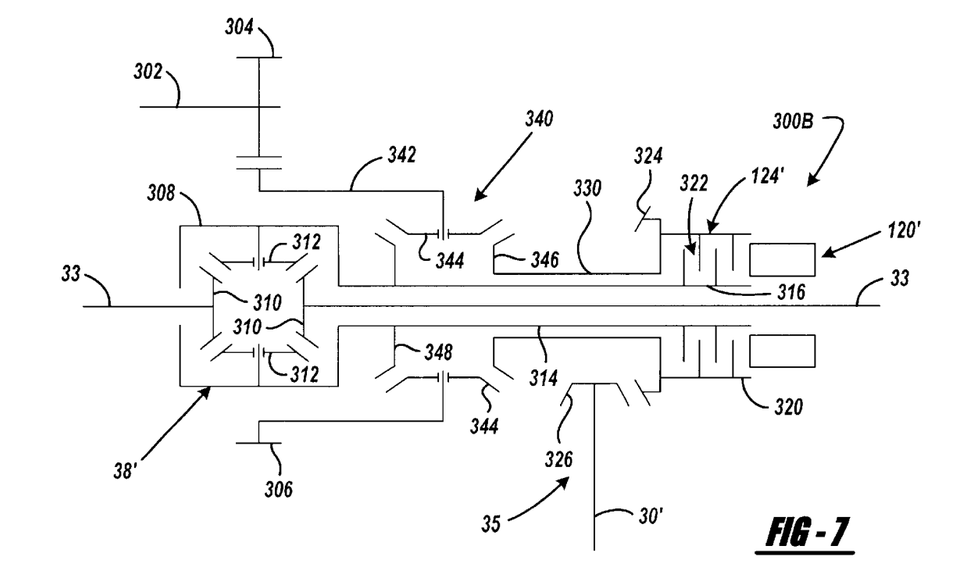

In addition to the on-demand 4WD systems shown previously, the torque transfer mechanism (magnetorheological clutch actuator and clutch assembly) of the present invention can likewise be used in full-time 4WD systems to adaptively bias the torque distribution transmitted by a center or "interaxle" differential unit to the front and rear drivelines. For example, FIG. 7 schematically illustrates a full-time four-wheel drive system which is generally similar to the on-demand four-wheel drive system shown in FIG. 6 with the exception that an interaxle differential unit 340 is now operably installed between carrier 308 of front differential unit 38' and transfer shaft 314. In particular, output gear 306 is fixed for rotation with a carrier 342 of interaxle differential 340 from which pinion gears 344 are rotatably supported. A first side gear 346 is meshed with pinion gears 344 and is fixed for rotation with drive shaft 330 so as to be drivingly interconnected to the rear driveline through transfer unit 35. Likewise, a second side gear 348 is meshed with pinion gears 344 and is fixed for rotation with carrier 308 of front differential unit 38' so as to be drivingly interconnected to the front driveline. Torque coupling 300B is arranged between drive shaft 330 and transfer shaft 314 and acts as a biasing clutch for variably controlling torque distribution between the front and rear drivelines. In operation, when sensor 54 detects a vehicle operating condition, such as excessive interaxle slip, controller 58 adaptively controls activation of the electromagnetic coil associated with magnetorheological clutch actuator 120' for controlling engagement of clutch assembly 124' and thus the torque biasing between the front and rear drivelines.

Figure 8:
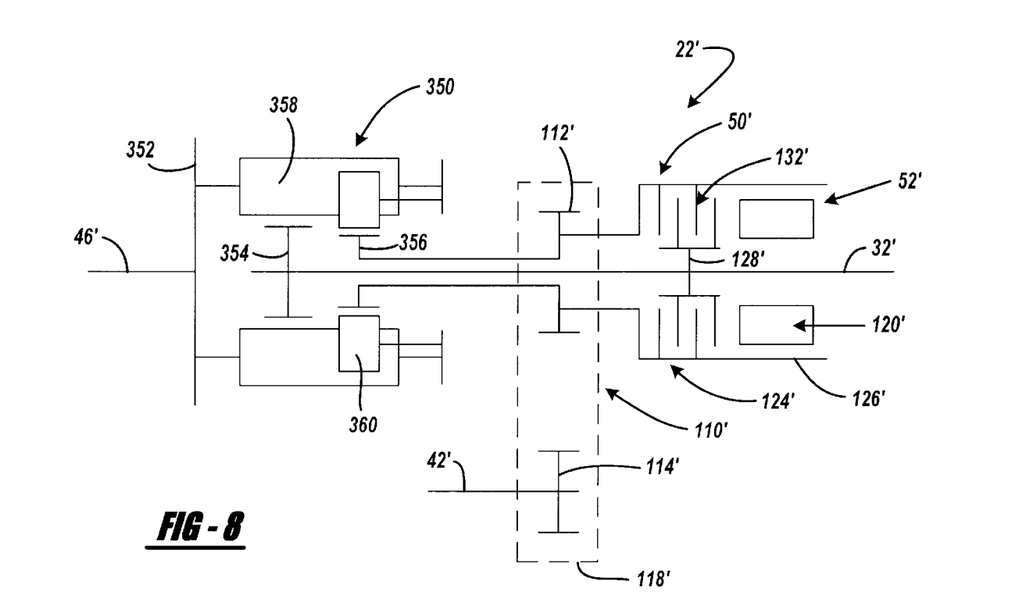

Referring now to FIG. 8, a full-time 4WD system is shown to include a transfer case 22' equipped with an interaxle differential 350 between an input shaft 46' and output shafts 32' and 42'. Differential 350 includes an input defined as a planet carrier 352, a first output defined as a first sun gear 354, a second output defined as a second sun gear 356, and a gearset for permitting speed differentiation between first and second sun gears 354 and 356. The gearset includes meshed pairs of first planet gears 358 and second pinions 360 which are rotatably supported by carrier 352. First planet gears 358 are shown to mesh with first sun gear 354 while second planet gears 350 are meshed with second sun gear 356. First sun gear 354 is fixed for rotation with rear output shaft 32' so as to transmit drive torque to rear driveline 12. To transmit drive torque to front driveline 14, second sun gear 356 is coupled to a transfer assembly 110' which includes a first sprocket 112' rotatably supported on rear output shaft 32', a second sprocket 114' fixed to front output shaft 42', and a power chain 118'.

Transfer case 22' further includes a biasing clutch 50' having a multiplate clutch assembly 124' and a mode actuator 52' having a magnetorheological clutch actuator 120'. Clutch assembly 124' includes a drum 126' fixed for rotation with first sprocket 112', a hub 128' fixed for rotation with rear output shaft 32', and a multi-plate clutch pack 132' operably disposed therebetween. Magnetorheological clutch actuator 120' includes an electromagnetic coil that can be energized for controlling the viscosity of the magnetorheological fluid for controlling movement of a piston relative to clutch pack 132'.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A transfer mechanism controlling a magnitude of clutch engagement force exerted on a multi-plate clutch assembly that is operably disposed between an input member and an output member, comprising:
    an actuator fixed for rotation with the input member and having a piston chamber formed therein;
    a piston slidably disposed within said piston chamber and selectively engaging a clutch pack of the multi-plate clutch assembly;
    a pump in fluid communication with said piston chamber via a supply passage and a return passage, said pump having a first pumping member fixed for rotation with said actuator and a second pumping member fixed for rotation with the output member for pumping a magnetorheological fluid through a flow path between said supply passage, said piston chamber and said return passage; and
    an electromagnet disposed adjacent to a portion of said return passage, wherein said electromagnet is selectively energized for manipulating a viscosity of said magnetorheological fluid to induce a back pressure within said piston chamber, thereby inducing axial movement of said piston for engaging the multi-plate clutch assembly.

2. The transfer mechanism of claim 1 wherein a rotational speed differential between said actuator and the output member induces pumping action of said pump for pumping said magnetorheological fluid through said flow path.

3. The transfer mechanism of claim 1, further comprising a flow restrictor formed within said return passage for restricting a flow of magnetorheological fluid therethrough.

4. The transfer mechanism of claim 3 wherein said flow restrictor is disposed adjacent said electromagnet.

5. The transfer mechanism of claim 1 wherein said piston is axially biased by a return spring against said back pressure within said piston chamber for varying an engagement condition of the multi-plate clutch assembly.

6. A transfer mechanism for controlling the magnitude of a clutch engagement force exerted on a multi-plate clutch assembly that is operably disposed between an input member and an output member, comprising:
    an actuator fixed for rotation with the input member and having a piston chamber and first and second flow passages formed therein;
    a piston slidably disposed within said piston chamber for selectively engaging a clutch pack of the multi-plate clutch assembly;
    a pump for pumping a magnetorheological fluid within a flow path defined between said piston chamber and said first and second flow passages; and
    an electromagnet operably disposed between said piston chamber and one of said first and second flow passages, wherein said electromagnet is selectively energized for manipulating a viscosity of said magnetorheological fluid to induce a back pressure within said piston chamber, thereby inducing axial movement of said piston for engaging the multi-plate clutch assembly.

7. The transfer mechanism of claim 6 wherein a rotational speed differential between the input member and the output member induces pumping action of said pump for pumping said magnetorheological fluid through said flow path.

8. The transfer mechanism of claim 6 further comprising a flow restrictor formed within said second passage for restricting a flow of magnetorheological fluid therethrough.

9. The transfer mechanism of claim 8 wherein said flow restrictor is disposed adjacent said electromagnet.

10. The transfer mechanism of claim 6 wherein said piston is axially biased by a return spring against said back pressure within said piston chamber for varying an engagement condition of the multi-plate clutch assembly.

11. A transfer case comprising of:
    an input shaft driving a first output shaft;
    a second output shaft;
    a multi-plate clutch assembly having an input member and an output member, said input member driven by said first output shaft and said output member coupled for driving said second output shaft; and
    a torque transfer mechanism for controlling the magnitude of a clutch engagement force exerted on said multi-plate clutch assembly, said torque transfer mechanism including an actuator fixed for rotation with said input member and having a piston chamber formed therein, a piston slidably disposed within said piston chamber for selectively engaging said multi-plate clutch assembly;
    a pump for pumping magnetorheological fluid through said piston chamber; and an electromagnet operably disposed between said piston chamber and said pump, wherein said electromagnet is selectively energized for manipulating a viscosity of said magnetorheological fluid to induce a back pressure within said piston chamber, thereby inducing axial movement of said piston for engaging said multi-plate clutch assembly.

12. The transfer case of claim 11 wherein a rotational speed differential between said input member and said output member induces pumping action of said pump for pumping said magnetorheological fluid through said piston chamber.

13. The transfer case of claim 11 further comprising a flow restrictor located downstream of said piston chamber for restricting flow of said magnetorheological fluid therethrough.

14. The transfer case of claim 13 wherein said flow restrictor is disposed adjacent said electromagnet.

15. The transfer case of claim 11 wherein said pump includes a first pumping member fixed for rotation with said actuator and a second pumping member fixed for rotation with said output member.

* * * * *